Jan. 13, 1942.  W. KECK  2,269,535
HOLDER FOR LICENSE VOUCHERS
Filed Jan. 25, 1940
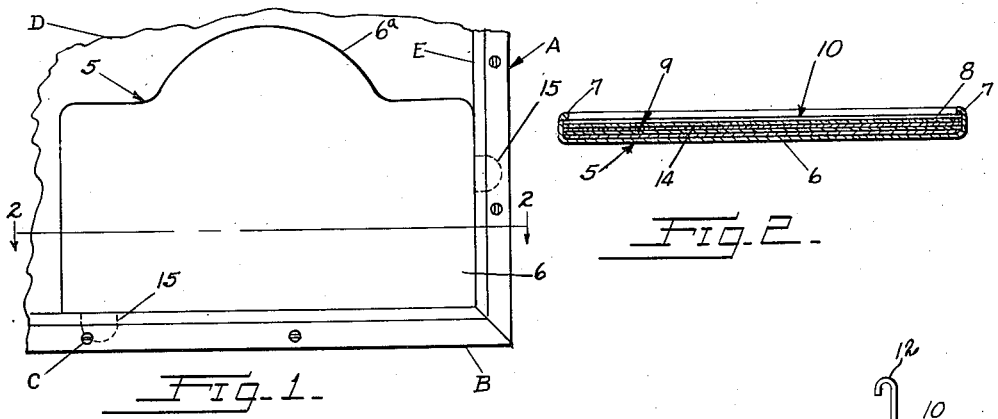
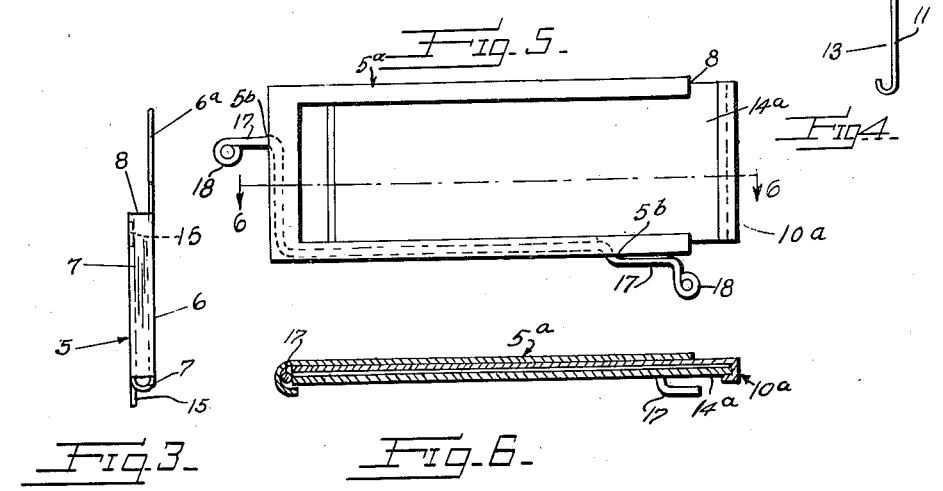
INVENTOR.
Walter Keck
A. E. Fisher
ATTORNEY.

Patented Jan. 13, 1942

2,269,535

UNITED STATES PATENT OFFICE 2,269,535

HOLDER FOR LICENSE VOUCHERS

Walter Keck, St. Louis, Mo.

Application January 25, 1940, Serial No. 315,457

1 Claim. (Cl. 40—10)

This invention relates to holders for displaying licenses, such as the small city licenses for automobiles, required to be displayed on the wind-shield of the car.

Such licenses are now generally in the form of decalcomanias and are transferred directly onto the glass wind-shield. However it is difficult to accomplish this transfer neatly, and the license form frequently gets torn or becomes disfigured and partially unreadable.

It is the purpose of the present invention to provide an independent holder for the license-label, voucher or billet, wherein the license-voucher may be readily inserted or removed, and the holder itself readily mounted on the wind-shield for properly displaying the license.

Another object is to provide a small outer frame having marginal guide-ways, means for attaching this holder to the wind-shield, and a separate inner license holder slidable in the guide-ways of the outer frame, this inner holder also having marginal guide-ways for slidably receiving the license voucher or billet fronted by a transparent facing of some sort.

In its preferred embodiment the invention comprises the elements and structural features shown in the accompanying drawing, wherein Figure 1 is a rear elevation of the lower right hand corner section of an automobile wind-shield (the conventional location of the small license-vouchers referred to), showing a holder constructed in accordance with my invention mounted in place.

Figure 2 is a section on the line 2—2 of Figure 1, of the holder only, the wind-shield being omitted.

Figure 3 is an end elevation of the holder as displayed in Fig. 1.

Figure 4 is an end elevation of the inner holder.

Figure 5 is a front elevation of a modified form of holder.

Figure 6 is a longitudinal section on the line 6—6 of Fig. 5.

The invention is for application to a conventional wind-shield A having a frame B secured to the automobile (not shown) by screws C and within which is mounted the glass D seated marginally in a channeled rubber strip or beading E.

As shown in the drawing, the invention comprises an outer oblong frame 5, closed at the back 6 and having frontally turned guide-ways 7 along its bottom and end margins, the top margin being left open and unobstructed, thus providing a slide-way 8. The back 6 may be extended upwardly as shown at 6a for providing a finger-piece, and the space thereon at front and rear may be utilized for advertising purposes.

The frame 5 is slightly greater in length and width, aside from the raised finger piece 6a, than the length and width of the standard license-voucher or billet 9 which it is designed to carry.

An inner oblong license holder 10 is provided, the same including a back 11 with guide-way 12 turned forwardly along its upper and lower margins, the ends being left unobstructed to form a slide-way 13. The holder 10 is sufficiently less in length and width to enable it to slide down into the slide-way 8 of the frame 5. The channels of the slideway 13 are of sufficient size to slidably engage a transparent facing 14 for locating in front of the license-voucher 9.

In mounting the voucher 9, it is faced against the transparent facing 14, cut to the same size, the two then slid endwise into the holder 10, and the latter slid down into the frame 5, the voucher being faced forwardly of course.

As shown in Figures 1 to 3, the device is mounted on the wind-shield by means of flat tabs 15 rigidly extended from the bottom and right hand end of the frame 5, the tabs being adapted to slide into the beading E, back of the glass D, at the bottom and right hand end of the wind-shield, and whereby the holder is supported in place.

Or as shown in Figures 5 and 6, the frame 5a opens endwise instead of at top, and the license holder 10a with transparent facing 14a, is slid endwise thereinto. A wire 17 may be incorporated in the frame 5a, at bottom and end, the ends of the wire being formed into outwardly turned eyes 18, for engaging certain of the screws C of the wind-shield A, said screws being removed and reseated through said eyes. The wire 17 is mounted in the frame by extending same through the channels at bottom and end thereof, and protruding the extremities out through apertures 5b, and forming the extremities into the eyelets 18.

While I have here shown and described specific structural features of the invention, same may be changed within the scope of the claim.

I claim:

In a device of the kind described, an outer frame open at front and having marginal guide-ways turned forwardly along three contiguous margins, the fourth margin being left open as a slide-way, an inner license holder also open at front for receiving a license-voucher or the like, the latter holder being dimensioned to slide into the slide-way of the frame, and wires extended from the frame, the extremities of the wires being formed into eyes for engaging screws for mounting the device on the wind-shield of an automobile.

WALTER KECK.